United States Patent [19]
Sabaa et al.

[11] Patent Number: 6,128,283

[45] Date of Patent: Oct. 3, 2000

[54] METHOD AND APPARATUS FOR DATA TRANSMISSION USING A POSITIVE GROUP ACKNOWLEDGEMENT PROTOCOL

[75] Inventors: Amr Gaber Sabaa, Napean; Kadir Ozdemir, Ottawa; Ming C. Leung, Napean; Derek Chung Lap Cheung, Kanata, all of Canada

[73] Assignee: Nortel Networks Corporation, Montreal, Canada

[21] Appl. No.: 08/984,191

[22] Filed: Dec. 3, 1997

[51] Int. Cl.⁷ .............................. G01R 31/08; H04L 12/28
[52] U.S. Cl. .......................... 370/236; 370/231; 370/394
[58] Field of Search .................................. 370/231, 230, 370/235, 389, 394, 395; 709/232, 234; 714/748, 749

[56] References Cited

U.S. PATENT DOCUMENTS

| | | | |
|---|---|---|---|
| 4,617,657 | 10/1986 | Drynan et al. | 370/60 |
| 5,245,616 | 9/1993 | Olson | 371/32 |
| 5,425,025 | 6/1995 | Tahara | 370/60 |
| 5,892,894 | 4/1999 | Shiroshita et al. | 395/182.02 |
| 5,905,727 | 5/1999 | Christensen et al. | 370/395 |
| 5,923,662 | 7/1999 | Stirling et al. | 370/432 |
| 5,933,435 | 8/1999 | Shah et al. | 370/232 |

*Primary Examiner*—Hassan Kizou
*Assistant Examiner*—Hanh Nguyen

[57] ABSTRACT

A novel system and apparatus for transmitting data between the two nodes of a network is provided. The transmission is effected by using an error recovery protocol featuring a positive group acknowledgement. A sender unit on one node receives the user data and groups the data into consecutive cells, the cells being clustered into groups, each cell in a group being assigned a unique sequence number. The groups of cells are transmitted over a physical channel to a receiver unit on a different node. The receiver unit examines the cell stream and issues an acknowledgment message to the sender unit only when all of the cells in a group have been received. Once the sender unit has completed the transmission of a group of cells, it starts observing the physical channel for an acknowledgement message from the receiver unit. If after a predetermined time period the acknowledgement message has not been received, the sender unit transmits the group of cells again. This system allows to reduce the number of acknowledgement messages between the sender unit and the receiver unit while allowing low error-rate transmission between the nodes of the network.

25 Claims, 7 Drawing Sheets

METHOD AND APPARATUS FOR DATA TRANSMISSION USING A POSITIVE GROUP ACKNOWLEDGEMENT PROTOCOL

FIELD OF THE INVENTION

The present invention relates generally to the field of data transmission, and more particularly to a method and apparatus for transmitting data between a sender unit and a receiver unit and permitting to detect transmission errors.

BACKGROUND OF THE INVENTION

Due to the inevitable presence of noise, communications systems must be capable of handling transmission errors. Retransmission is generally used to achieve a reliable communication but it also increases the load in the network and reduces the network throughput, especially when the number of acknowledgements is comparable to that of the data cells. The various acknowledgement protocols have been implemented in the past to enable the detection of transmission errors. A brief description of the prior art acknowledgement techniques is provided below.

Negative acknowledgment: Negative acknowledgement refers to a protocol that requires the receiver unit of the communication system to signal the sender unit that cells are missing in order to trigger a retransmission. No communication system can be built based on negative acknowledgement only as there will be no way for the sender unit to know that the cells sent are received and also there is no mechanism to flush the contents of the sending a window. A possible implementation of a window mechanism, either at the sender unit or at the receiver unit, could be in the form of a simple buffer that temporarily holds the cells while a decision mechanism determines how the cells are to be processed (either flushed or passed to another device, etc.)

Positive acknowledgement: Positive acknowledgement refers to a protocol that requires the receiver unit of the communication system to signal the sender unit that cells are received. Retransmission is triggered when a message acknowledging reception of a certain cell is missing, For error free links, the number of positive acknowledgement messages equals the number of data cells. This constitutes a significant waste of the available bandwidth. For high bandwidth utilization the sender unit is required to implement a window mechanism to store cells which have not been acknowledged. The hardware implementation for the window mechanism is not easy in the high speed environments as the size of the window should be large enough to store cells that may be received while the receiver unit is waiting for a particular cell to be transmitted. This is required in order to maintain the order of the cells in the data stream.

Positive and negative acknowledgement: the selective repeat protocol is an example of this method that relies on having positive and negative acknowledgement messages. This method requires implementing a window mechanism in both the sender and receiver units. If positive and negative acknowledgement are used without some sort of window mechanism at the receiver side, more than one negative acknowledgement messages may be sent for a lost cell. The receiver unit sends an acknowledgement for the first out of sequence cell. Before the sender unit receives this negative acknowledgement and resends the lost cell, it may already have sent many cells.

Thus, there exists in the industry a need to provide an improved transmission protocol that is capable to detect error transmissions while, at the same time, permitting to reduce the number of acknowledgement messages in the data link.

OBJECTS AND STATEMENT OF THE INVENTION

An object of the invention is to provide a novel method and a system for data transmission permitting to detect transmission errors in a data link while allowing to reduce the number of acknowledgement messages in the data link by comparison to prior art methods.

Another object of the invention is to provide a novel sender unit for transmitting cells of data to a receiver unit. The sender unit is capable to format the data cells in a way to allow the receiver unit to easily identify a transmission error.

Yet, another object of the invention is to provide an improved receiver unit for receiving cells of data, the receiver unit being capable of detecting transmission errors.

As embodied and broadly described herein the invention provides a data transmission system, comprising:

a sender unit including:
  an input for receiving user data;
  means for arranging the user data into a plurality of cells forming a group, each cell including a sequence identifier portion and a user data portion, said sequence identifier portion including a sequence identification data defining an order of transmission of the cell with relation to other cells of said group, at least one cell of said group including an acknowledgement request mark;
a receiver unit capable of being connected through a data transmission pathway to said sender unit, said receiver unit including:
  an input for receiving cells transmitted from said sender unit through the data transmission pathway;
  sequence controller means for observing the sequence identification data in a cell received by said receiver unit and determining a sequence of the cell with relation to cells previously received by said receiver unit;
  means for issuing an acknowledgement message to said sender unit in response to an acknowledgement request mark in a given cell received by said receiver unit, said means for issuing an acknowledgement message being in operative relationship with said sequence controller means, said means for issuing an acknowledgement message being precluded from issuing an acknowledgement message when said sequence controller means determines that the given cell has triggered an out of sequence error.

In a most preferred embodiment of this invention, the error detection and correction protocol discussed earlier, is used for transmitting data in an ATM network where the sequence of the data cells is maintained in the physical transmission link between the nodes supporting the sender unit and the receiver unit, respectively. The sender unit that can be software implemented, includes a cell building functional element that is primarily designed to receive the user data, break-up this data into consecutive cells and gather the cells into a group. The frame of each cell includes a group ID portion, a cell sequence number portion an acknowledgement mark portion and a user data portion, among other portions that may be necessary for the transmission of the information. The group ID portion contains a group ID identifier that is the same for each cell of a given group, thus allowing to distinguish groups of cells from one another. The sequence number portion includes a sequence identification data that, in a specific example is a unique number assigned to each cell to identify the order of the cell with relation to other cells in the group. This sequence number is important because it allows to maintain the cells, either in the sender unit or at the receiver unit, in the proper sequence so the user data can be correctly reconstructed. The acknowledgement mark portion holds data instructing the receiver unit as to whether an acknowledgement message should be sent for that particular cell. The acknowledgement mark portion can be a field of the cell frame a holding a single bit, the value "0" designating that no acknowledgement message is to be sent, while the value "1" indicating that an acknowledgement message is required. Most preferably, in a group of cells, the acknowledgement mark portion for each cell will be set to a value indicating that no acknowledgement message is required, except that last cell for which acknowledgement is necessary. This, in tact, constitutes a group acknowledgement mechanism allowing to notify the sender unit that a complete group of cells has been correctly received. The user data portion is the data carrier vehicle designed to hold any type of digital information that one is desirous of transmitting.

Once a group of cells has been generated, they are transferred to a sending window assigned to that particular cell group, under the control of a sending window control functional element. The sending window is, in essence, a buffer that holds the group cells to permit an initial transmission and a retransmission if necessary$_{[spg1]}$. The sending window is connected to a transmitting buffer that it is designed to direct the cells of the group to a physical transmission channel connecting the sender unit and the receiver unit.

Once a group of cells has been transmitted through the physical transmission channel, an acknowledgement control functional element begins observing the physical transmission channel for an acknowledgement message from the receiver unit. When the acknowledgement message is received, the acknowledgement control functional element notifies the sending window control functional element accordingly. If the acknowledgement message is received within a predetermined time period, indicating that all the cells in the group have had been received, the sending window is flushed. If no acknowledgement message is received or if the message is received but too late, then the sending window control functional element instructs the sending window to retransmit the group of cells again.

In a most preferred embodiment, the sender unit is provided with a plurality of sending windows all under the control of the same sending window control functional element. This mechanism allows the sender unit to manage the transmission of several independent cell groups.

The receiver unit connected to the other end of the physical transmission channel is most preferably hardware implemented. The receiver unit includes a cell analyzer functional element in operative relationship with a plurality of sequence controllers, each sequence controller been assigned to a unique cell group. The cell analyzer functional element receives the stream of cells transmitted over the physical transmission channel. For each cell received the cell analyzer functional element observes the group ID data and on the basis of this information directs the sequence number data in the cell to a sequence controller assigned to that particular cell group. The function of the sequence controller is to determine if an out of sequence condition has occurred. An out of sequence may occur when the sequence number of a given cell indicates that a cell in the sequence is missing (the sequence is broken). If such out of sequence condition is noted, the sequence controller notifies the cell analyzer functional element accordingly to preclude the latter from issuing an acknowledgement message for that cell (assuming the cell carries an acknowledgment mark bit set to "1" or "Yes"). Without such error condition notification, the cell analyzer functional element will transmit an acknowledgement message when the acknowledgement mark in the cell is set to indicate that an acknowledgement message should be issued. The acknowledgement message includes an identifier allowing the sender unit to distinguish the message from other acknowledgement messages that belong to different group cells. Most preferably, the acknowledgement message includes the group ID number.

As embodied and described herein the invention also provides a sender unit for transmitting data, said sender unit including:

an input for receiving user data;

means for arranging the user data into a plurality of cells forming a group, each cell including a sequence identifier portion and a user data portion, said sequence identifier portion including a sequence identification data defining an order of transmission of the cell with relation to other cells of said group, at least one cell of said group including an acknowledgement request mark;

an output for transmitting said group of cells;

means responsive to an error of transmission condition to retransmit said group of cells.

As embodied and described herein the invention also provides a receiver unit capable of being connected through a data transmission pathway to said sender unit, said receiver unit including:

an input for receiving a succession of data cells arranged into at least one group, each cell including a sequence identifier portion and a user data portion, said sequence identifier portion including a sequence identification data defining an order of the cell with relation to other cells of said group, at least one cell of said group including an acknowledgement request mark;

sequence controller means for observing the sequence identification data in a cell received by said receiver unit and determining a sequence of the cell with relation to cells previously received by said receiver unit;

means for issuing an acknowledgement message in response to an acknowledgement request mark in a given cell received by said receiver unit, said means for issuing an acknowledgement message being in operative relationship with said sequence controller means, said means for issuing an acknowledgement message being precluded from issuing an acknowledgement message when said sequence controller means determines that the given cell in said group has triggered an out of sequence error.

As embodied and broadly described herein the invention also provides a machine-readable temporary storage medium for coupling to a data communication pathway, said machine-readable temporary storage medium holding a data structure comprising a plurality of data cells forming a group, cells of said group being capable of being transmitted in succession in the data communication pathway, each cell including:

a user data portion containing user data;

a cell sequence identifier portion including a sequence identification data defining an order of transmission of the cell in the data communication pathway with relation to other cells of said group;

said group including a final cell, the sequence identification data of said final cell designating said final cell as a last cell in the order of transmission of the cells in said group in the data communication pathway;

said final cell including an acknowledgement mark portion including data capable of being interpreted by a receiver unit connected to the data communication pathway as request for issuance of an acknowledgement message when each cell of said group has been received by the receiver unit.

As embodied and broadly described herein, the invention also provides a method for transmitting user data from a point of origin to a destination point remote from said point of origin, said method comprising the steps of:

arranging the user data into a plurality of cells forming a group, each cell including a sequence identifier portion and a user data portion, said sequence identifier portion including a sequence identification data defining an order of transmission of the cell with relation to other cells of said group, said group including a final cell, the sequence identification data of said final cell designating said final cell as a last cell in the order of transmission of the cells in said group;

transporting the cells of said group to said destination point in a sequence established by the sequence identification datum;

issuing an acknowledgement message from said destination point to said point of origin upon observance of the following conditions;

reception of said final cell at said destination point; and all the cells of said group are received at said destination point in accordance with the sequence established by the sequence identification datum.

DESCRIPTION OF A PREFERRED EMBODIMENT

Figure 1:
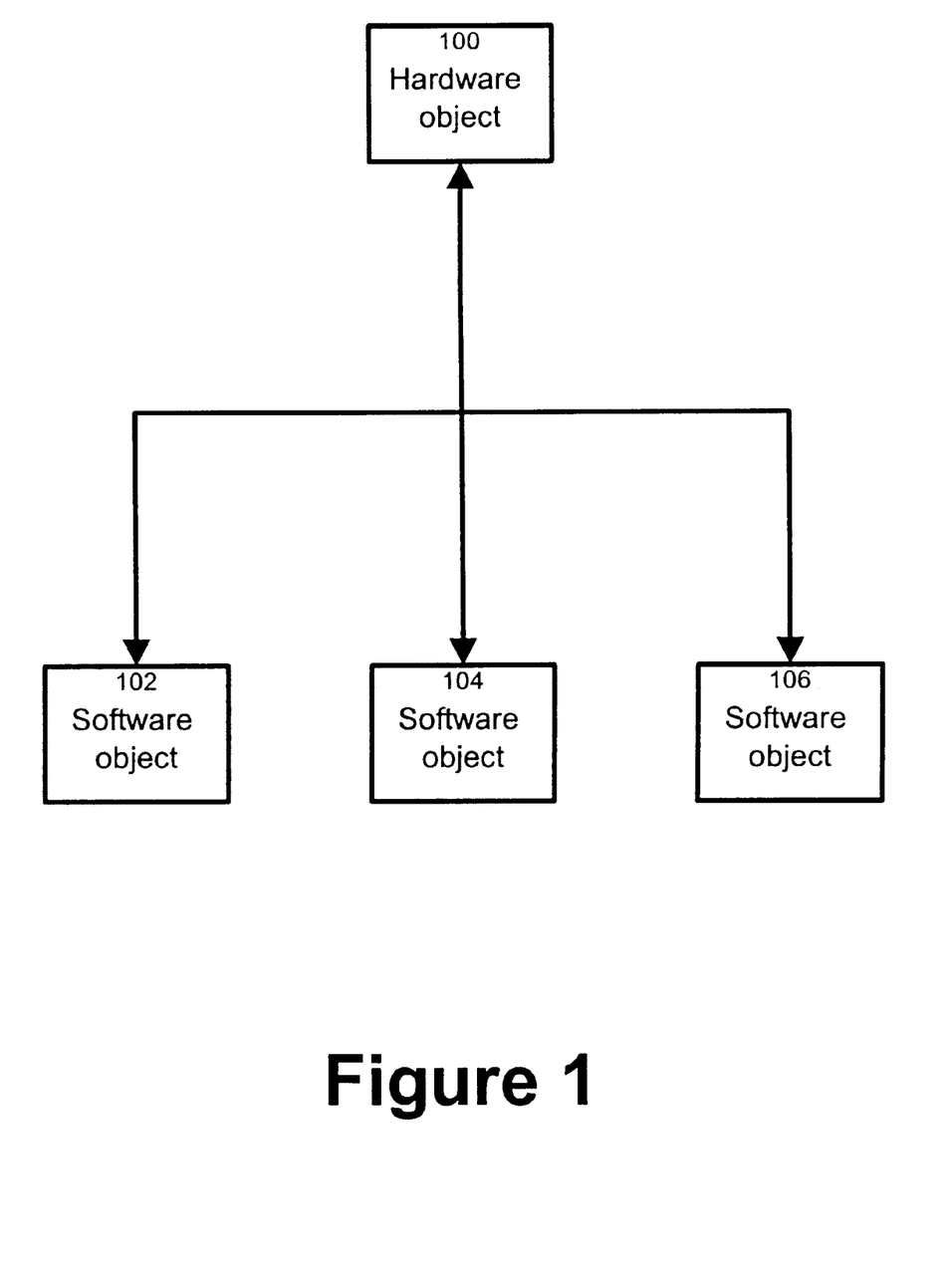
FIG. 1 is a block diagram of nodes in a network implementing the data transmission protocol in accordance with the present invention.

FIG. 1 illustrates a simple network that may implement the data transmission protocol in accordance with the present invention. The network includes a plurality of objects that exchange data over data communication pathways. In the example shown, three nodes designated 102, 104, and 106 implement sender units that transmit data cells to a node 100. The sender units 102, 104 and 106 are most preferably software implemented while the receiving node of 100 uses hardware-implemented functionality.

Figure 2:
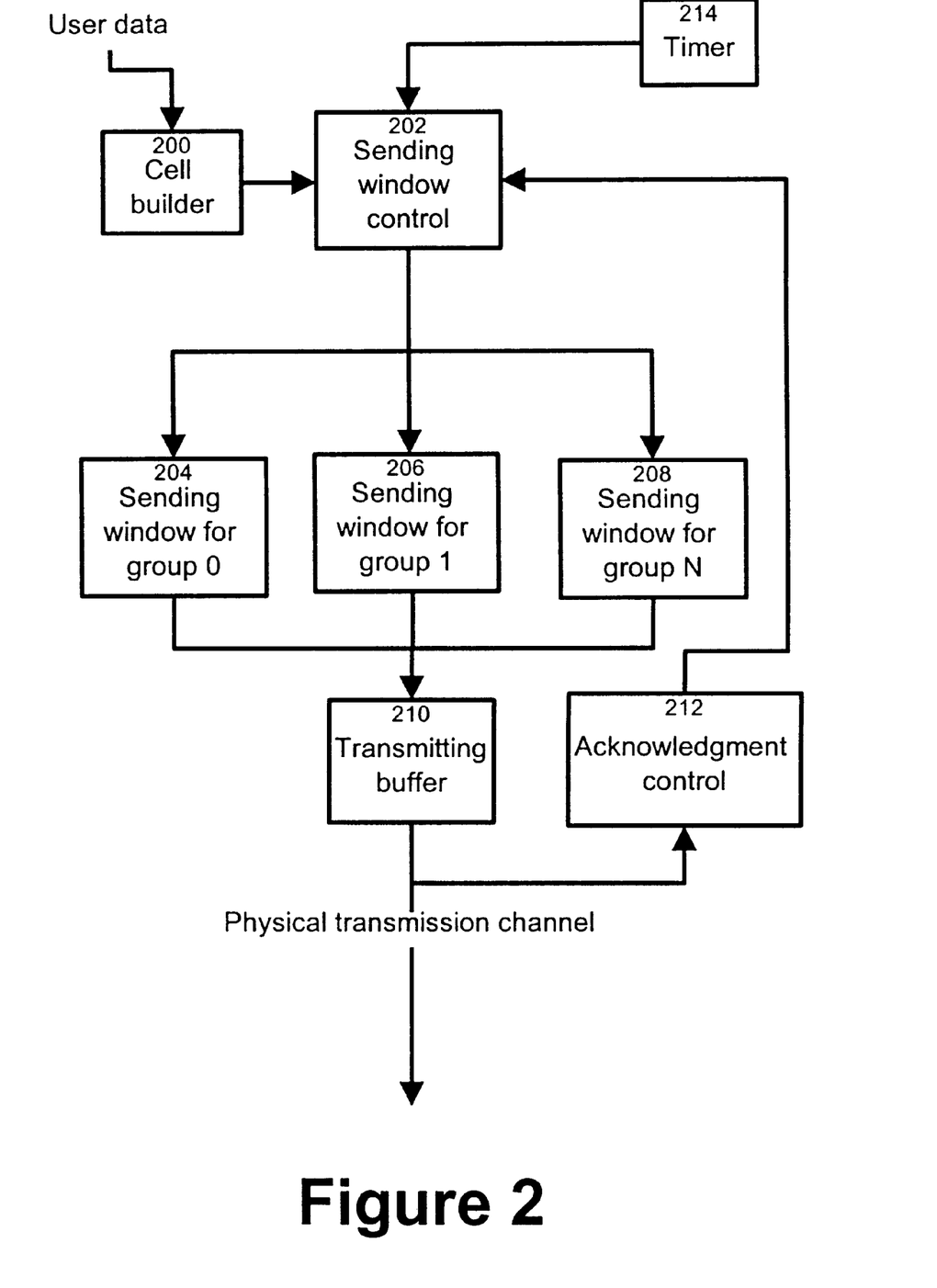
FIG. 2 is a block diagram of a sender unit on one of the nodes of the network shown at FIG. 1.

The structure of a sender unit is depicted in greater detail in FIG. 2. As mentioned earlier, the sender unit is implemented by software that operates on any suitable computing apparatus. Typically, such a computing apparatus includes a processor and memory for holding data and instructions for execution by the processor. In addition suitable input/output devices are required to enable the computing apparatus to transmit and receive data with external devices.

Figure 3:
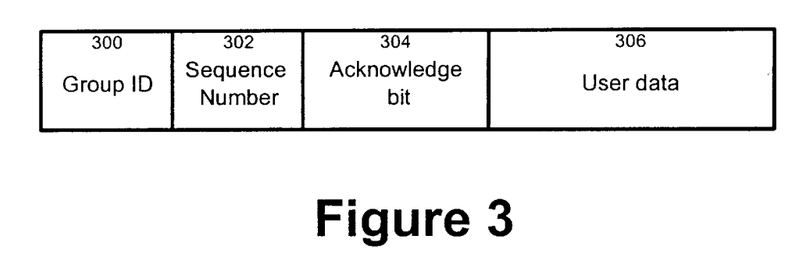
FIG. 3 graphically illustrates a cell frame of the type generated by the sender unit depicted at FIG. 2.

The sender unit includes a cell builder functional block 200 that includes an input for receiving the user data, in other words the digitized information to be transmitted by the sender unit. The basic function of the cell builder functional block is to break-up the user data into successive data cells, append to those cells information necessary for the proper transmission of the cells and gather the cells into groups. The structure of a data cell frame is depicted at FIG. 3. The data cell frame includes a group ID portion 300 that holds information permitting to identify the group to which a given cell belongs. Typically, in a given group, all the cells have the same group ID number or value. The data cell frame also includes a sequence number portion 302 that contains a number uniquely distinguishing the data cell from the other cells in the group and also providing the order of the cell with relation to the other cells in the group. The sequence number is important because it establishes the order with which the cells are transmitted between nodes of the network.

The data cell frame also includes an acknowledgement message mark 304 that can be in the form of a single bit field to designate two possible states. One possibility is to provide the value "0" to designate that an acknowledgement message is not required, while the value "1" indicates that an acknowledgement message should be issued. Finally, the data cell frame includes a user data portion 306 for holding the digital information to be transmitted by the cell. In addition to the fields described above, the data cell frame may also include additional fields necessary to effect the transmission of the information. A description of those additional fields, however, is not required since those fields are not critical in the context of the description relating to the error detection and recovery protocol.

Figure 4:
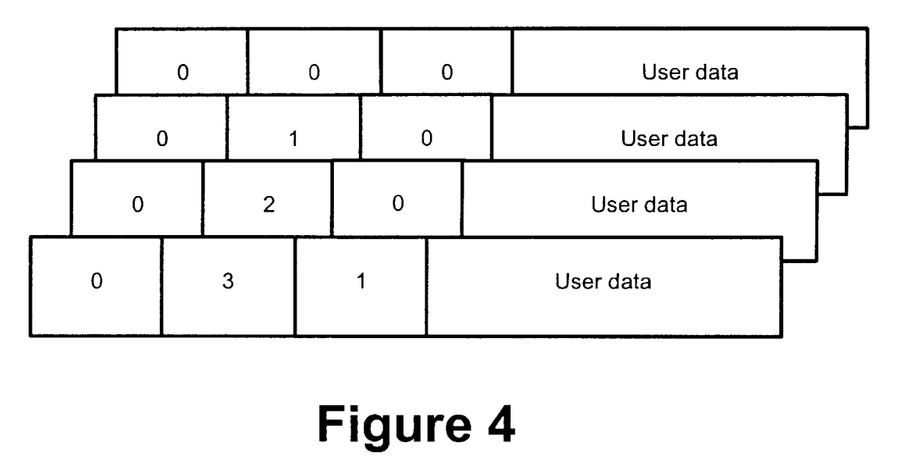
FIG. 4 illustrates a plurality of data cells forming a group of cells.

FIG. 4 illustrates a group of cells that, for the purpose of this example, includes four individual data cells. Each cell in that group includes the same group ID number, "0" for instance, a unique sequence number, from 0 to 3, and an acknowledgement mark. For every data cell, the acknowledgement mark it is set to "0" except on the last cell where the mark is set to "1" indicating that an acknowledgement message is required when the last data cell is received by the receiver unit.

Referring back to FIG. 2, the sender unit includes a sending window control functional element 202 and a plurality of sending windows 204, 206 and 208 that are essentially buffers holding respective groups of cells. When a group of cells is assembled by the cell builder 200, it is passed to the sending window control functional element 202 that, in turn, passes the data cells to the sending window assigned to their group. This feature enables the sender unit to manage the transmission of two or more group cells. This can be used when the sender unit is transmitting data from different sources. The sending windows 204,206 and 208 can transfer, under the control of the sending window control functional element 202, the data cells to a transmitting buffer 210 connected to the physical transmission channel that leads to the hardware object 100. An acknowledgement control functional element 212 is connected to the physical transmission channel to observe any acknowledgement messages that may be issued from the receiver unit. If any such message is noted, a signal is sent to the sending window control functional element 202. In response to that signal, the sending window control functional element 202 will flush the sending window corresponding to the cell group, since the acknowledgement message indicates that the group of cells has been correctly received. A timer 214 provides a time-out period within which the sending window control functional element 202 must receive the acknowledgement message. If such acknowledgement message is not received within the prescribed time-out period, the sending window control functional element 202 assumes that an error has occurred during the transmission and resends the entire group of cells again. The sending window will not be flushed and the cells will be periodically retransmitted until a proper acknowledgement message is received from the receiver unit. The retransmission is triggered by the sending window control 202 when a time-out occurs.

Figure 5:
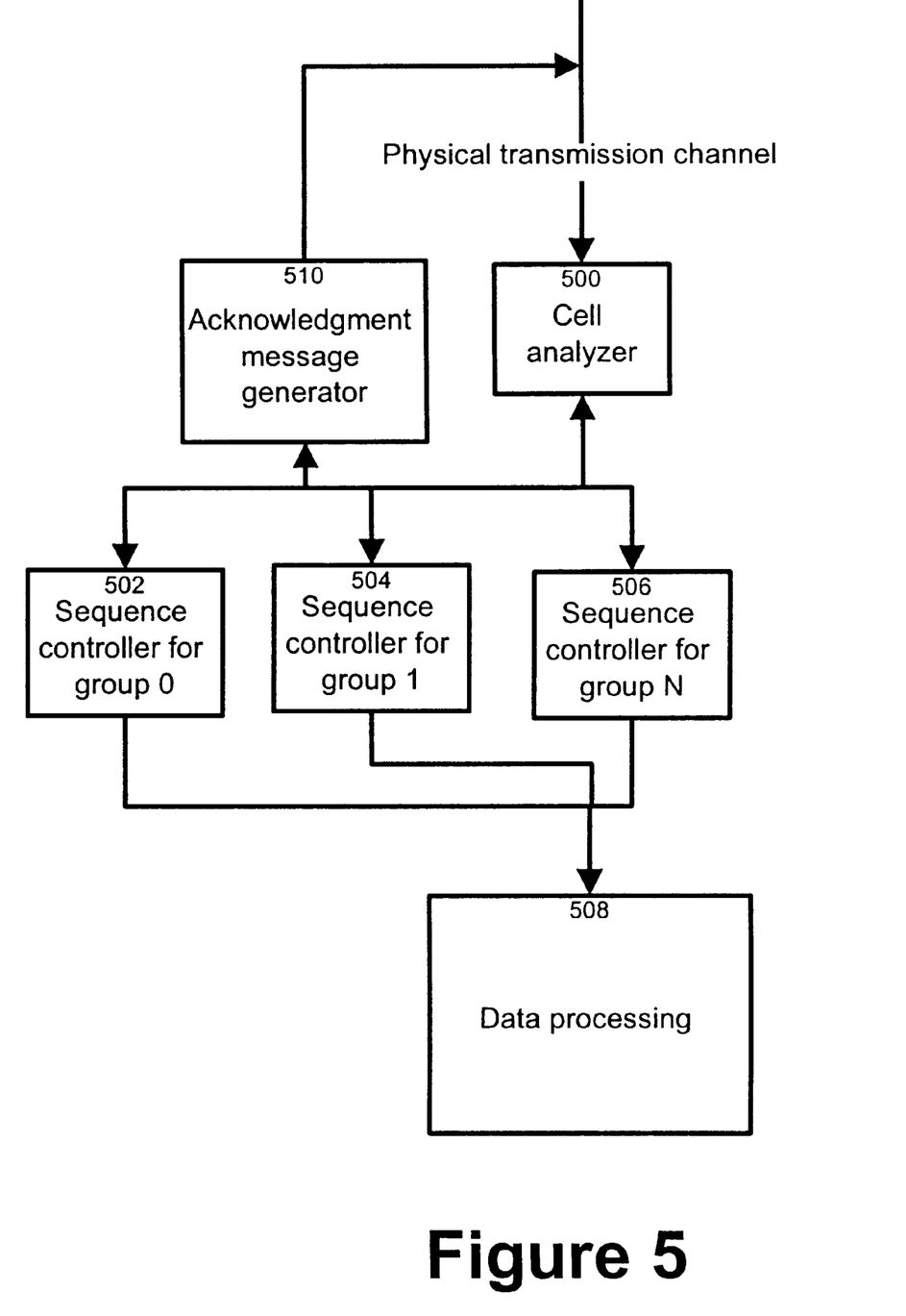
FIG. 5 is a block diagram of a receiver unit at one node of the network depicted at FIG. 1.

The structure of the receiver unit is illustrated in greater detail at FIG. 5. The receiver unit includes a cell analyzer functional block 500 connected to the physical transmission channel. The cell analyzer receives the stream of data cells issued from one or more sender units of the type depicted at FIG. 2. The cell analyzer reads the group ID number in each data cell it receives and dispatches the cell to a sequence controller/buffer (called "sequence controller" in the document for simplicity) assigned to that particular group. In FIG. 5 three sequence controllers are shown identified by the numerals 502, 504 and 506, however more or less controllers can be provided in dependence upon the number of groups present in the system. The function of any one of the sequence controllers is to determine if all the cells in a given group have been correctly received. This is effected by a reading the sequence number of each cell. The sequence controller buffers the expected sequence number. A cell will not be accepted unless its sequence number is the same as the expected one. If the sequence number is different from the expected to one, the cell will be dropped. An out of sequence error flag is generated occurs when an element of the sequence is missing. In other words, the cell that has arrived has a sequence number higher than the expected sequence number. Broken sequences are the kind of errors most likely to occur since they result from a loss in the transmission of one or more individual cells. The out of sequence error flag disables the generation of the acknowledgement message, as it will be described later.

The sequence controller also examines the acknowledgement mark bit to determine if an acknowledgement message should be sent. When a cell is encountered where the acknowledgement mark bit is set to "1" and at the same time no out of sequence error has occurred, the sequence controller issues a signal to an acknowledgement message sender 510 that it, in turn, generates an acknowledgement message of the proper format in the physical transmission channel. That acknowledgement message conveys the group ID number to enable the sender units to flush the sending window associated with that particular group.

Figure 5A:
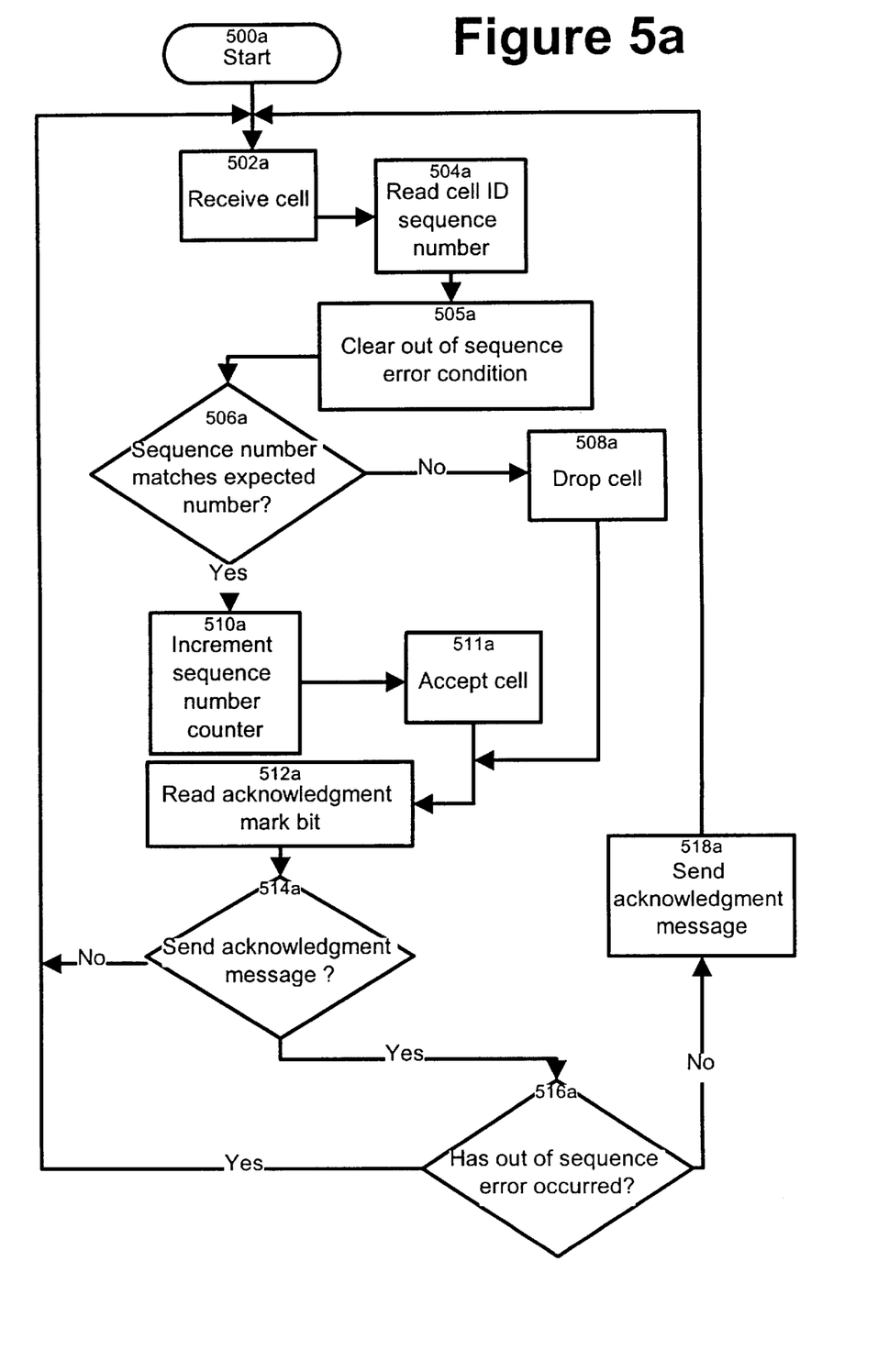
FIG. 5a is a flowchart illustrating the sequence of events taking place when a data cell is received by the receiver unit shown in FIG. 5.

This process is illustrated at FIG. 5*a*. The process starts at step 500*a*. At step 500*a* a cell is received by the sequence controller. At step 504*a* the sequence number of the cell is read. At step 505*a* an out of sequence error condition that may have been set during a previous execution of the loop is cleared, thus allowing an acknowledgement message to be sent, if a number of conditions described below are met. At step 506*a* the sequence number is compared with the expected sequence number held in any suitable counter. If no match is found the cell will be dropped as depicted by the bloc 508*a*. If a match exists, as established by the query at step 506*a*, the sequence number counter is incremented at step 510*a*. At the next step 511*a* the cell is accepted, in other words it is placed in any suitable queue that holds cells considered as accepted. The acknowledgement bit of the cell is then read at step 512*a*. If the acknowledgement bit is set to a value indicating that an acknowledgement message should be sent, as determined at step 514*a*, the system determines if an out of sequence error has occurred, at step 516*a*. As discussed earlier, the out of sequence error of arises when a sequence is broken, in other words expected cells are missing. When the cells are numbered consecutively and in increasing order, an out of sequence error will manifest itself when the sequence number of the cell is higher than the expected sequence number. It is important to note that when the sequence number of the cell is less than the expected sequence number, this condition will not trigger an out of sequence error. As it will be discussed below, a sequence number less than the expected sequence number will result in a dropped cell, however if the dropped cell carries an acknowledgement mark bit set to a value indicative that a message is to be sent, the command will be executed.

If no out of sequence error is detected, the acknowledgement message is sent as illustrated by the block 518*a*. Otherwise, no acknowledgement message is sent and the system proceeds with processing the next cell. In the case when a cell has been dropped at step 508 the processing nevertheless continues to determine if an acknowledgement message should be sent. That is effected as discussed earlier and a message is dispatched at the condition that no out of sequence error has occurred.

Referring back to FIG. 5, the sequence controllers 502, 504 and 506 are also connected to a data processing block 508 that makes use of the user data in the cells. Once a certain group of cells has been dealt with by the respective sequence controller, that group of cells is released to the data processing block. Each sequence controller may also be designed to strip from each cell any unnecessary information and keep only the user data. In addition, the sequence controller may be designed to append the various user data portions, in accordance with the sequence established by the sequence numbers, to form a continuous bit stream that can be directly processed by the data processing block 508.

Figure 6:
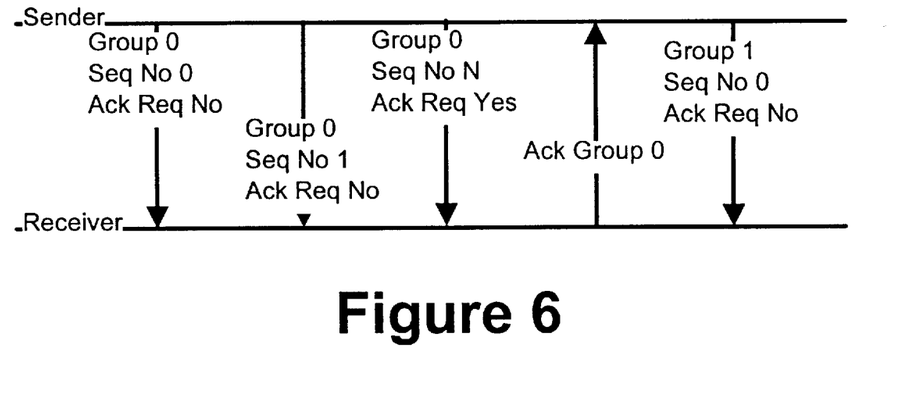
FIG. 6 illustrates a sequence of events taking place during the transmission of a group of cells from the sender unit towards the receiver unit; where no transmission error occurs.

FIG. 6 illustrates the data exchange during a successful transmission. The sender unit sends cells that belong to the group ID "0", the cells being consecutively numbered starting with "0" and ending with sequence number "IN". Acknowledgement is not required for any cell in the group except the last one (the cell with sequence number "N") where the acknowledgement mark bit is set to "1" or "Yes". When the receiver unit gets the last cell in the group, it sends a positive group acknowledgement to acknowledge the successful reception of all the cells in the first group. After sending the last cell in the first group, the sender unit will start a time-out period. At the same time, it will send the second group cells. Those cells are characterized by a group ID number of "1". The first group cells will be stored until their group acknowledgement is received. After that, the sending window will be flushed from the first group cells.

When the first group number is re-used, the cell sequence numbers will be started from N+1. This will ensure that there will be no duplicate delivery of cells in a group even if the acknowledgement is lost and all the cells in the group are retransmitted.

Figure 7:
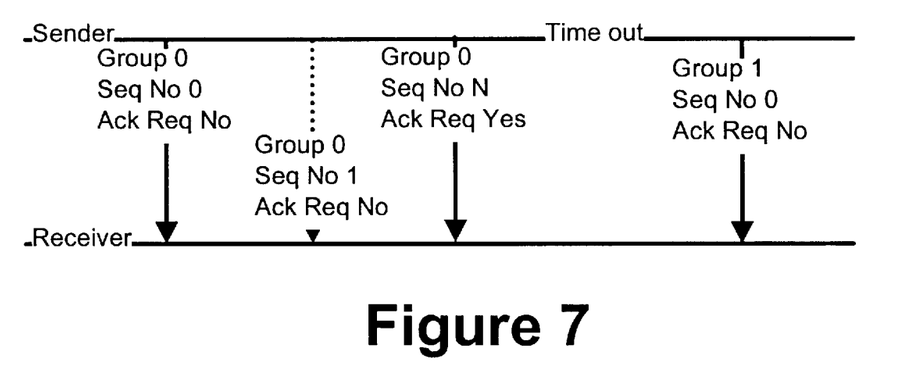
FIG. 7 is identical to FIG. 6, except it shows the events occurring when a data cell is not correctly received by the receiver unit.

FIG. 7 shows a scenario when a cell is lost (in the example shown a lost cell is identified by the arrow in broken lines). The receiver unit buffers the expected sequence number in a sequence number counter. A cell will not be accepted unless its sequence number is the same as the expected one. When the second cell is lost, the remaining cells in the group are also dropped because the sequence numbers of those cells also do not match the expected sequence numbers (this is the case since in the case of a dropped cell the sequence number counter is not incremented). Also the first dropped cell will trigger an out of sequence error because its sequence number is higher than the expected sequence number. In turn, the out of sequence error precludes the system from sending an acknowledgement message even though the last cell of the group that carries the acknowledgement mark bit set to "1". After the sender unit sends the last cell in the group, it will wait for the group acknowledgement during the predetermined time-out period. After the time-out the sender unit will retransmit all the cells in the group. The receiver unit will then start dropping cells again until the expected sequence number is encountered. Upon encountering that sequence number cells are accepted again and the sequence number counter is incremented. At certain point the acknowledgement message will be issued.

Figure 8:
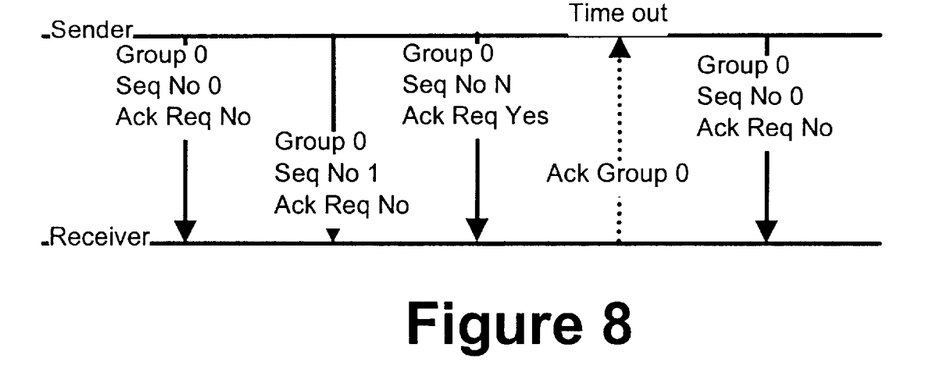
FIG. 8 is identical to FIG. 6 except that it shows the events occurring when an acknowledgement message is not received by the sender unit.

FIG. 8 shows an error recovery scenario when a group acknowledgement is lost. After the sender unit transmits the last cell in a group it will wait for an acknowledgement a timeout period. When the sender unit discovers that the acknowledgement is missing, it will retransmit all the cells in the group. The receiver has already all these cells and the expected sequence number in the sequence number counter is set for the last cell in the group+1, in other words the sequence number following the last cell. The cell with such sequence number does not exist, however, this arrangement permits avoidance of an out of sequence error condition, thus enabling the dispatch of the positive acknowledgement message. More specifically, when the last cell in the group is received, it is dropped because its sequence number is less than the value in the sequence number counter. However, the instruction the cell carries to send an acknowledgement message is executed because no out of sequence error condition has been triggered, due to the fact that the sequence number of the cell is less than the expected sequence number.

A situation involving two sender units and is a single receiver unit is very similar to the case when a sender unit is transmitting two cell groups at the same time. The receiver unit maintains a status buffer for each group by using a group assigned sequence controller.

Most preferably, the receiver unit is implemented by using simple logic gates to build the various counters, buffers and other components necessary for its operation. It is not deemed necessary to provide a detailed description of the circuitry since the design of such circuitry is well within the reach of a person skilled in the art. It is also possible to implement the functionality of the receiver unit by using software operating on a suitable computing platform. This, however, is less desirable for practical reasons.

The above description of a preferred embodiment should not be interpreted in any limiting manner as refinements and variations are possible without departing from the spirit of the invention. The scope of the invention is defined by the appended claims and their equivalents.

What is claimed is:

1. A data transmission system, comprising:
   a sender unit including:
     an input for receiving user data;
     a sender unit coupled to said input, said sender unit being operative for arranging the user data into a plurality of cells forming a group, each cell including a sequence identifier portion and a user data portion, the sequence identifier portion including a sequence identification data element defining an order of transmission of the cell with relation to other cells of the group, each cell in the group having an acknowledgement request data portion containing an acknowledgement request data element capable of acquiring at least two possible states namely:
       a first state indicating that acknowledgment of the cell is desired;
       a second state indicating that acknowledgement of the cell is not desired;
     at least one cell of the group including an acknowledgement request data element that is in the second state and at least another cell of the group including an acknowledgement request data element that is in the first state;
   a receiver unit capable of being connected through a data transmission pathway to said sender unit, said receiver unit including:
     an input for receiving cells transmitted from said sender unit through the data transmission pathway;
     a sequence controller unit operative for observing a sequence identification data element in a cell received by said receiver unit and determining a sequence of the cell with relation to cells previously received by said receiver unit;
     an acknowledgement message generator unit operative for issuing an acknowledgement message to said sender unit when an acknowledgement request data element in the first state is present in a given cell received by said receiver unit, said acknowledgement message generator unit being in operative relationship with said sequence controller unit, said acknowledgement message generator unit being precluded from issuing an acknowledgement message when said sequence controller unit determines that the given cell triggers an out of sequence error.

2. A data transmission system as defined in claim 1, wherein the group includes a final cell, the sequence identification data element of the final cell designating the final cell as a last cell in the order of transmission of the cells in the group, the final cell including an acknowledgement request data element in the first state.

3. A data transmission system as defined in claim 2, wherein each cell of the group, except the final cell has an acknowledgement request data element in the second state.

4. A data transmission system as defined in claim 3, wherein each cell in the group includes a group ID data element, the group ID data element being identical for each cell of the group.

5. A data transmission system as defined in claim 3, wherein said sender unit includes a sending window capable of storing cells for a given group.

6. A data transmission system as defined in claim 5, wherein said sender unit includes a plurality of sending windows, each sending window being associated with a given group of cells, each sending window being capable of storing cells of a respective group.

7. A data transmission system as defined in claim 5, wherein said sender unit includes an acknowledgement control functional element, said acknowledgement control functional element being responsive to a acknowledgement message for causing to flush data cells held therein.

8. A data transmission system as defined in claim 5, comprising a sending window control functional element, said sending window control functional element being responsive to an absence of acknowledgement message within a predetermined period of time from a transmission of a group of cells from said sending window to cause said sending window to retransmit the group of cells.

9. A data transmission system as defined in claim 1, wherein said sequence controller unit includes a counter for holding an expected sequence identification data element of a cell yet to be received by said receiver unit.

10. A data transmission system as defined in claim 9, wherein said sequence controller unit is operative for deleting a received cell when a sequence identification data of the cell does not matches the sequence identification data in said counter.

11. A sender unit for transmitting data, said sender unit including:
an input for receiving user data;
a first unit coupled to said input for arranging the user data into a plurality of cells forming a group, each cell including a sequence identifier portion and a user data portion, the sequence identifier portion including a sequence identification data element defining an order of transmission of the cell with relation to other cells of the group, each cell in the group comprising an acknowledgement request data portion containing an acknowledgement request data element capable of acquiring at least two possible states namely:
a first state indicating that acknowledgment of the cell is desired;
a second state indicating that acknowledgement of the cell is not desired;
at least one cell of the group including an acknowledgement request data element in the second state and at least another cell of said group including an acknowledgement request data element in the first state;
an output coupled to said first unit for transmitting the group of cells;
a second unit responsive to an error of transmission condition to cause said first unit to retransmit said group of cells.

12. A sender unit for transmitting data as defined in claim 11, wherein the group includes a final cell, the sequence identification data of the final cell designating the final cell as a last cell in the order of transmission of the cells in the group, the final cell including an acknowledgement request data element in the first state.

13. A sender unit for transmitting data as defined in claim 12, wherein each cell of the group, except the final cell has an acknowledgement request data element in the second state.

14. A sender unit for transmitting data as defined in claim 13, wherein each cell in the group includes a group ID data element, the group ID data element is identical for each cell of the group.

15. A sender unit for transmitting data as defined in claim 13, wherein said sender unit includes a sending window capable of storing cells for a given group.

16. A sender unit for transmitting data as defined in claim 15, wherein said sender unit includes a plurality of sending windows, each sending window being associated with a given group of cells, each sending window being capable of storing cells of a respective group.

17. A sender unit for transmitting data as defined in claim 15, wherein said second unit includes an acknowledgement control functional element, said acknowledgement control functional element being responsive to a acknowledgement message for causing flushing of data cells held therein.

18. A sender unit for transmitting data as defined in claim in claim 15, comprising a sending window control functional element, said sending window control functional element being responsive to an absence of acknowledgement message within a predetermined period of time from a transmission of a group of cells from said sending window to cause said sending window to retransmit the group of cells.

19. A receiver unit capable of being connected through a data transmission pathway to a sender unit, said receiver unit including:
an input for receiving from the transmission pathway a succession of data cells arranged into at least one group, each cell including a sequence identifier portion and a user data portion, said sequence identifier portion including a sequence identification data element defining an order of the cell with relation to other cells of the group, each cell in the group comprising an acknowledgement request data portion containing an acknowledgement request data element capable of acquiring at least two possible states namely:
a first state indicating that acknowledgment of the cell is desired;
a second state indicating that acknowledgement of the cell is not desired;
at least one cell of the group including an acknowledgement request data element in the second state and at least another cell of the group including an acknowledgement request data element in the first state;
a sequence controller unit operative for observing the sequence identification data element in a cell received by said receiver unit and determining a sequence of the cell with relation to cells previously received by said receiver unit;
an acknowledgement message generator unit operative for issuing an acknowledgement message in response to an acknowledgement request data element in the first state in a given cell received by said receiver unit, said an acknowledgement message generator unit being in operative relationship with said sequence controller unit, said an acknowledgement message generator unit being precluded from issuing an acknowledgement message when said sequence controller unit determines that the given cell in the group has triggered an out of sequence error.

20. A data transmission system as defined in claim 19, wherein said sequence controller unit includes a counter for holding an expected sequence identification data element of a cell yet to be received by said receiver unit.

21. A data transmission system as defined in claim 20, wherein said sequence controller unit is operative for deleting a received cell when a sequence identification data element of the cell does not matches the sequence identification data element in said counter.

22. A machine-readable storage medium for coupling to a data communication pathway, said machine-readable storage medium holding a data structure comprising a plurality of data cells forming a group, cells of the group being capable of being transmitted in succession in the data communication pathway, each cell including:
a user data portion containing user data;
a cell sequence identifier portion including a sequence identification data element defining an order of transmission of the cell in the data communication pathway with relation to other cells of the group;
an acknowledgement request data portion containing an acknowledgement request data element capable of acquiring at least two possible states namely:
a first state indicating that acknowledgment of the cell is desired;
a second state indicating that acknowledgement of the cell is not desired;

the group including a final cell, the sequence identification data of the final cell designating the final cell as a last cell in the order of transmission of the cells in the group in the data communication pathway;

the final cell including an acknowledgement data element in the first state capable of being interpreted by a receiver unit connected to the data communication pathway as a request for issuance of an acknowledgement message when each cell of said group has been received by the receiver unit.

23. A machine-readable storage medium as defined in claim 22, wherein each cell of the group, except said final cell has an acknowledgement request data element in the second state.

24. A machine-readable storage medium as defined in claim 23, wherein each cell in the group includes a group ID portion, the group ID portion including a group identification data element identical for each cell of said group.

25. A method for transmitting user data from a point of origin to a destination point remote from said point of origin, said method comprising:

arranging the user data into a plurality of cells forming a group, each cell including a sequence identifier portion and a user data portion, the sequence identifier portion including a sequence identification data element defining an order of transmission of the cell with relation to other cells of the group, each cell in said group having an acknowledgement request data portion containing an acknowledgement request data element capable of acquiring at least two possible states namely:
a first state indicating that acknowledgment of the cell is desired;
a second state indicating that acknowledgement of the cell is not desired;

at least one cell of the group including an acknowledgement request data element in the second state and at least another cell of said group including an acknowledgement request data element in the first state;

transporting the cells of the group to the destination point in a sequence established by the sequence identification data elements of the cells of the group;

issuing an acknowledgement message from said destination point to said point of origin upon observance of the following conditions:
a) reception of a certain cell including an acknowledgement request data element in the first state; and
b) all the cells of the group preceding the certain cell in the sequence established by the sequence identification data elements of the cells are received at said destination point in accordance with the sequence established by the sequence identification data elements of the cells.

* * * * *